Maurice A Bergougnou  Inventor

By [signature] Patent Attorney

Sept. 11, 1962  M. A. BERGOUGNOU  3,053,917
ALKYLATING ISOPARAFFINS WITH ATOMIZED OLEFINS
Filed Jan. 4, 1960  3 Sheets-Sheet 2

Maurice A Bergougnou  Inventor

By  *Byron O. Dimmick*  Patent Attorney

Sept. 11, 1962    M. A. BERGOUGNOU    3,053,917
ALKYLATING ISOPARAFFINS WITH ATOMIZED OLEFINS
Filed Jan. 4, 1960    3 Sheets-Sheet 3

Maurice A. Bergougnou    Inventor

By  Byron O. Dimmick
            Patent Attorney 3,053,917
ALKYLATING ISOPARAFFINS WITH ATOMIZED OLEFINS
Maurice A. Bergougnou, Linden, N.J., assignor to Esso Research and Engineering Company, a corporation of Delaware
Filed Jan. 4, 1960, Ser. No. 119
7 Claims. (Cl. 260—683.59)

The present invention concerns improvements in the acid catalyzed alkylation of isoparaffinic hydrocarbons with olefin hydrocarbons to produce branched chain paraffins. Hydrocarbons of the latter type are important and desirable constituents for automotive and aviation fuels because of their high antiknock properties. This invention is particularly directed to improvements in alkylation reactions wherein the olefin is introduced into an agitated emulsion of isoparaffinic hydrocarbon and liquid acid catalyst. The invention is directed toward improving both the yield and quality of alkylate while minimizing acid consumption and undesired side reactions.

A particular problem that presents itself when alkylating isoparaffinic hydrocarbons with olefinic hydrocarbons in the presence of liquid acid catalysts such as sulfuric acid is that of preventing, or at least minimizing, the polymerization of the olefins or their degradation to sludge by contact with the acid catalyst. It is now well known that this problem can be solved to a great extent by conducting the alkylation reaction under conditions that will avoid as much as possible the intimate contact of the olefins with the catalyst material in the comparative absence of isoparaffins. To accomplish this, a substantial excess of isoparaffins is provided in the reaction zone, the olefins are prediluted with paraffin hydrocarbons, and then jetted into a well agitated emulsion of acid catalyst, isoparaffins, hydrocarbons and reaction products. Even with all of these precautions, however, there are certain disadvantages in the direct injection of the olefin feed into the emulsion. As the olefin stream enters the emulsion, a relatively small amount of emulsion becomes entrained in the jet stream. As a result, there may be present in the vicinity of the olefin feed a ratio of 1 to 2 volumes of acid for each volume of olefin as compared with the normally desired ratio of about 1000 volumes of acid for each volume of olefin. Under these undesirable conditions, there is a great tendency for the formation of "bad alkylate" (87–88 Motor Octane Number) rather than the 96 to 98 Motor Octane Number product desired.

It is one object of the present invention to provide a method for introducing an olefin feed into a stirred emulsion of acid catalyst and hydrocarbons that will minimize the formation of undesired products and thereby increase the overall quality of the alkylate.

In accordance with the present invention, the olefins preferably premixed with paraffins (iso and/or normal) are introduced into the agitated emulsion of hydrocarbons and liquid acid catalyst in the form of small atomized droplets. The formation of the droplets occurs in a region within the reaction zone above the body of emulsion. These droplets then drop down into the emulsion. This technique avoids the localized high rates of olefin transfer that exist when employing the conventional method of olefin introduction i.e. introducing the olefin directly into the emulsion in the form of jet streams. It is easy to see that in the present invention the olefin will have to diffuse through the isoparaffin in the droplet to reach the emulsion. Thus, the olefine will be fed slowly to a large excess of emulsion well saturated in isoparaffin. Other advantages of the process of the present invention are that a more rapid removal of the heat of reaction is effected since the major portion of the reaction occurs at the top of the body of emulsion and that each reacting drop of premixed olefin is surrounded by a large body of cold emulsion. Still another advantage is that emulsion stirring requirements are less for the present invention than for the conventional practice wherein the olefin is jetted into the emulsion. Furthermore, the olefin introduction technique of this invention prevents the corrosion of jet nozzles and headers that is experienced in conventional alkylation apparatus designs. Concomitantly, this prevents the production of bad alkylate that normally results from the malfunctioning of the equipment due to corrosion of the olefin injection headers and nozzles.

A better understanding of the invention will be obtained when reference is made to the ensuing description and to the accompanying drawing in which.

The invention will be particularly described with reference to the alkylation of isobutane in the presence of concentrated sulfuric acid as catalyst. It is not intended, however, that the invention be limited to this particular alkylation reaction. The same principles can be applied to related reactions using other isoparaffins such as isopentane as well as other olefins such as propylene or amylenes. The invention also contemplates the use of other suitable liquid catalysts in place of sulfuric acid, as for example phosphoric acid, mixtures of sulfuric acid and phosphoric acid and hydrofluoric acid.

Figure 1:
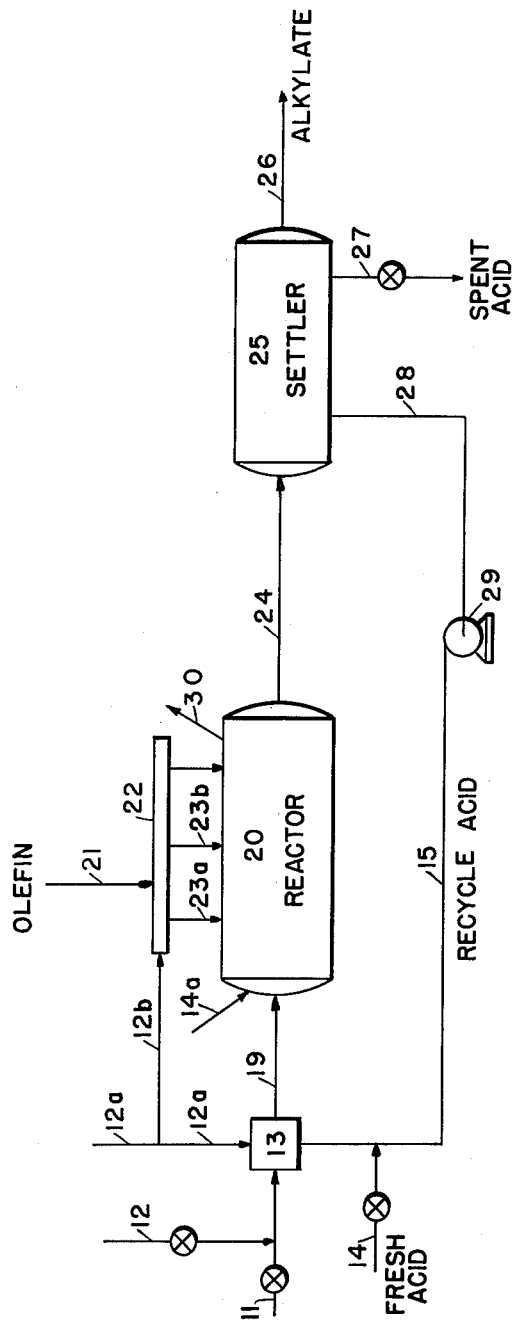
FIGURE 1 is a schematic flow diagram of a process for conducting an alkylation reaction in accordance with the present invention.

Referring now to FIGURE 1 in detail, the general features of the alkylation process may be understood. A reaction vessel 20 is employed which will be of a size sufficient to handle the volume of material being processed within the residence time required for effecting the alkylation reaction. Means are provided for introducing the reacting materials into the vessel and for removing reaction products therefrom. For proper control of the reaction, it is preferred that the acid catalyst be mixed with at least a portion of the isoparaffin reactants before entering the reaction zone. Thus, an isobutane feed made up of fresh isobutane obtained by means of line 11 and recycle isobutane entering through line 12 is conducted into a mixing zone 13 where it is mixed with sulfuric acid catalyst. The catalyst enters the mixing zone through fresh acid line 14 and recycle acid line 15. After the operation has been started, a major source of the acid will be recycle acid from the product settler. Fresh makeup acid is then added directly to the reactor through line 14a to prevent undesirable reactions with any hydrocarbon components that may be present in the recycle acid.

The mixture of acid and isoparaffin that is prepared in mixing zone 13 is conducted by means of line 19 into reactor 20. The olefin feed, e.g. butylene, enters the reactor by means of line 21. Preferably, the olefin stream is diluted with isoparaffins, e.g. isobutane, so that a maximum of about 10 volume percent olefins will be present in the olefin feed. A suitable diluent is recycle isobutane from the product fractionation system which is obtained via line 12a. The desired quantity of recycle isobutane is fed into mixing manifold 22 where it mixes with the olefin stream entering through line 21. Separate streams of olefin feed then enter the several stages of the reactor through feed lines 23a, 23b, etc., and are distributed within each reaction stage by means subsequently described in connection with FIGURE 2. Preferably the olefin feed stream is precooled to a temperature lower than the temperature in the reaction zone. For a reactor temperature of 40–60° F., the olefin feed temperature should not exceed 35° F. and preferably should be even lower. The mixture of acid, isoparaffin and olefin is maintained as a well mixed emulsion in reactor 20 by suitable means and preferably by a mechanical stirrer and appropriate baffles as will also be explained in connection with FIGURE 2.

Suitable provision is made to maintain the reaction temperature at a desired level which is preferably at about 40° to 60° F. Preferably, the reaction temperature is controlled by autorefrigeration. To accomplish this, overhead vapors from the reactor 20 are removed through line 30 and conducted to a refrigeration system which is not shown. The isobutane that is recovered from this system constitutes the recycle isobutane obtained by means of line 12.

A portion of the emulsion is continuously withdrawn from reactor 20 through line 24 and sent to the product settler 25 where separation between hydrocarbons and acid catalyst takes place. Spent acid catalyst from the product settler is discarded through line 27, while recycle acid is removed from the settler by line 28 and returned by means of pump 29 through the recycle line 15 to the mixing zone 13 as previously described.

The reaction product leaves the settler through line 26 and is sent through the conventional caustic and water wash steps and a subsequent fractionation step. Isoparaffin recovered from the product is sent back to the reactor through line 12a as previously described.

Figure 2:
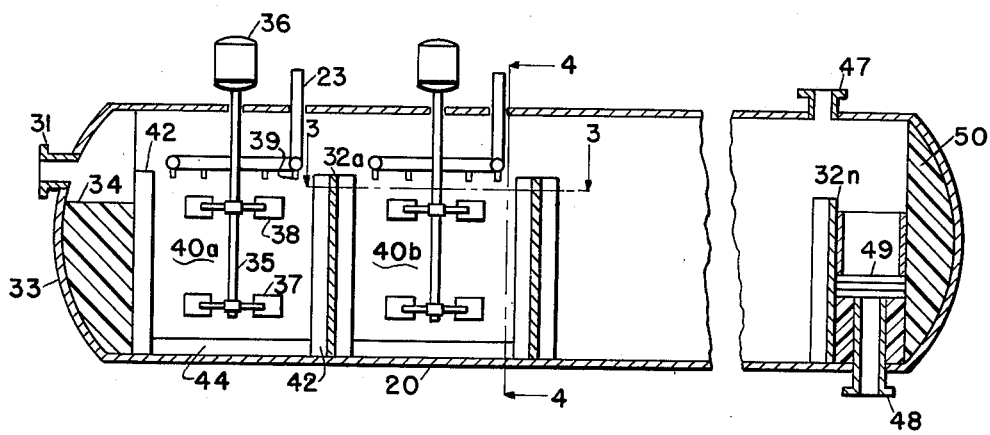
FIGURE 2 is a sectional side elevational view of one form of stirred reactor that may be used in practicing this invention.
Figure 3:
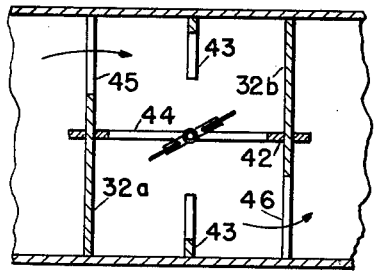
FIGURE 3 is a broken sectional plan view taken on line 3—3 of FIGURE 2.
Figure 4:
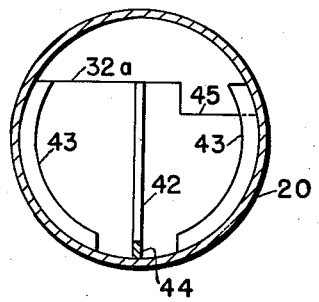
FIGURE 4 is a sectional elevation taken on line 4—4 of FIGURE 2.

In FIGURES 2 to 4 inclusive are shown details of one design of a stirred reactor for effecting the alkylation reaction of this invention. This design provides for successive stages or zones within the reactor, with each stage being isolated by appropriate baffles and with stirring means in each stage or zone. Olefin feed is introduced separately into each of the zones. Considering now FIGURES 2 and 3 in detail, reactor 20 comprises a horizontal cylindrical vessel having an inlet 31 through which the mixture of acid catalyst and isoparaffin enters the reactor, and a plurality of vertical baffles 32a, 32b, etc., which divide the reactor into separate reaction zones 40a, 40b, and so on. It is preferred that each reactor have ten to twenty of such zones in series, although only two complete zones are shown.

A quantity of fill material 33 occupies the inlet end of the vessel to provide a vertical wall for the inlet end of the first reacton zone. Conveniently, this fill material may comprise a phenolic resin containing carbon particles. A flat surface 34 is provided above the fill material adjacent the inlet 31 to serve as a flash pan for removal of vapors from the entering mixture and thus minimize mixer impeller cavitation during the stirring of the emulsion. As much as 60 percent of the vapors accumulating in the reactor may originate on or in the vicinity of the flash pan.

The reaction mixture in each of the zones is kept agitated by stirring means 35 driven by a motor 36. Preferably, stirring means are provided that have two sets of vertically spaced stirring blades, such as 37 and 38 as shown, to assure that the top of the emulsion as well as the main body of emulsion will be stirred efficiently. Since the droplets of premixed olefin are preformed before they enter the emulsion, power requirements for stirring will be less for the present invention than for a process wherein jets of olefin are directed into the emulsion as in prior practice.

The olefin stream entering the reactor through one of the lines 23 is forced through a plurality of atomizing nozzles 39 distributed in a plane generally parallel to and positioned above the surface of the stirred emulsion. Such atomizing nozzles are well known and are so designed that they produce a "warped" sheet of liquid that issues from the tip of the nozzle and then breaks up after a short distance into very small droplets. Thus, the injected olefin feed forms a plurality of small atomized droplets which fall into the stirred emulsion. The nozzles are situated at a sufficient distance above the body of emulsion to assure that droplet formation will occur before the liquid olefin reaches the body of emulsion, thereby avoiding high olefin transfer rates.

As shown more clearly in FIGURE 3, auxiliary vertical baffles 42 and 43 are positioned within each of the reaction zones. Also, a central ridge baffle 44 is placed on the bottom of each zone. These auxiliary baffles ensure that there will be highly efficient mixing of the olefin with the isoparaffin and acid catalyst.

As additional isoparaffin and acid catalyst enter the reactor inlet the reaction mixture will flow from zone to zone toward the emulsion outlet 48. By providing separate zones or stages, and by introducing the olefin separately into each well agitated zone, the danger that excess olefin will be present at any time is substantially eliminated, thereby preventing the undesirable side reactions of olefin polymerization and sludge formation. A vapor outlet 47 is provided at the top of the reactor so that volatile hydrocarbons may be removed overhead to regulate the reaction temperature by autorefrigeration. While a small quantity of the olefin feed will also be drawn off as vapor and will find its way into the refrigertnt stream, this is not considered objectionable.

The top edge of each of the vertical baffles 32 except the final one is stepped down on one side so that flow from one reaction zone to the next takes place on only one side of the baffle. Also, the steps on successive baffles alternate from side to side. Thus, baffle 32a has a step 45 on the right-hand side as shown in FIGURE 4, and baffle 32b has a step 46 on the left-hand side. As shown by the arrows in FIGURE 3, this causes the emulsion to take a tortuous path through the reactor, thus minimizing any tendency for the emulsion to bypass any of the zones. Such baffles are referred to as side flow baffles. The final baffle 32n does not have a stepped down edge but is at the same height across its entire top edge. The height of the latter baffle controls the height of the liquid level in the reactor.

The outlet end of the reactor is partially filled in with material 50 of a similar nature to that of fill material 33 at the inlet end. This reduces the volume of the space between the last baffle 32n and the end of the vessel, thus minimizing holdup time in this region and preventing undesirable side reactions which tend to occur in poorly mixed zones. A conventional type of anti-vortex baffle 49 is provided at the top of the outlet 48.

Figure 5:
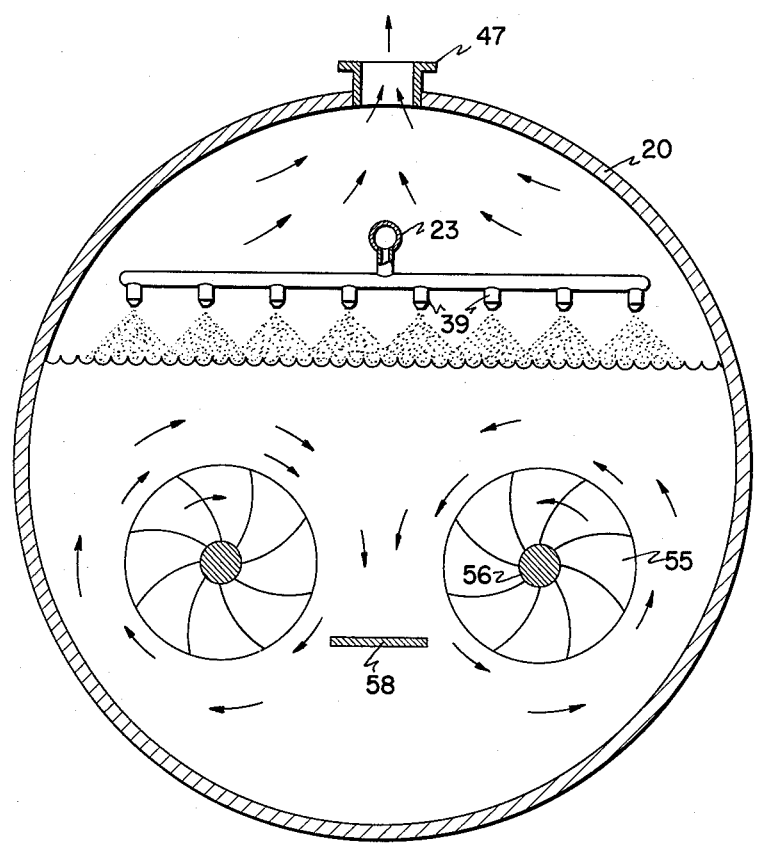
FIGURE 5 is a transverse sectional elevational view of an alternative form of stirred reactor that may be employed.

A transverse elevational sectional view of an alternative form of reactor is shown in FIG. 5. In this modification the stirring mechanism comprises vane type mixers 55 rotating on horizontal shafts 56 that extend longitudinally of the reaction vessel 20. This arrangement will impart a rapidly rolling action to the emulsion and assist in the proper contacting of the dispersed olefin droplets with the emulsion. A centrally positioned baffle 58 promotes the mixing efficiency.

In a representative alkylation reaction wherein butylenes are alkylated with isobutane in the presence of sulfuric acid of 90 to 95% strength to produce about 10,000 barrels per stream day (b./s.d.) of alkylate, about 5700 b./s.d. of olefins and about 6700 b./s.d. of fresh isobutane will be consumed. As it is preferred to maintain a substantial molar excess of isoparaffin to the olefin in the alkylation reaction, considerable isobutane from the reaction product is recycled to the reactor so that the reactor actually handles about 14,000 b./s.d. of isobutane, exclusive of that required for autorefrigeration. Likewise, although the above quantities of hydrocarbon materials may require about 84 tons of fresh 98% sulfuric acid per stream day, the actual amount of acid flowing through the system per day will be much greater since the ratio of recycle acid to fresh acid may be of the order of 200 to 1 or more.

By employing a plurality of reactors 20 in series it is possible to control reaction temperatures very effectively by autorefrigeration, thus maintaining substantially the same reaction temperature throughout the series by adjustment of the pressure in each reactor to control the amount of hydrocarbons removed overhead. As a typical example, a reaction temperature of 40° F.±3° F. may be maintained in each of four reactors in series by keeping the pressures at about 26, 24, 21 and 18 p.s.i.a., respectively.

The following additional explanation will be helpful in understanding why the olefin introduction method of the present invention is superior to the conventional method which involves injection of olefin directly into the emulsion. At the end of a typical jet stream within the emulsion in the conventional method, the olefin is broken repeatedly into sheets of liquid which finally form droplets. During the initial stages of the sheet formation and breaking of the sheets there is rapid transfer of olefin to the limited amount of emulsion surrounding the tip of the jet. The result is that a small "blob" of emulsion is thereby subjected to a large transfer of olefin in a very short period of time, which is a condition known to give "bad alkylate." It is not enough to provide large excesses of acid and isoparaffin relative to olefin in the reaction zone if those large excesses are not available to the olefin when it reacts, i.e., within the few brief instants after the olefin is jetted into the emulsion. To avoid this difficulty the high olefin transfer rate is prevented by allowing contact of olefin with emulsion only after the sheet breaking phase of the olefin injection step has been completed and the individual drops are already well formed.

It is to be understood that the present invention is not to be limited to the specific embodiments herein described, for many modifications thereof are possible without departing from the spirit or scope of the invention. The scope of the invention is to be determined by the claims appended hereto.

What is claimed is:

1. In the alkylation of isoparaffin hydrocarbons with olefin hydrocarbons in the presence of a concentrated liquid sulfuric acid catalyst, wherein the olefin hydrocarbons are introduced into a turbulent emulsion comprising isoparaffin hydrocarbons and acid catalyst in a reaction zone, the improvement which comprises introducing the olefin feed into the reaction zone in a region above the body of emulsion, separating the olefin into very small droplets in said region and conducting said droplets into said emulsion.

2. Process as defined by claim 1 wherein said olefin hydrocarbons are premixed with paraffin hydrocarbons.

3. Process as defined by claim 1 wherein said olefin hydrocarbons are cooled below the temperature existing in said reaction zone prior to said introduction therein.

4. Process as defined by claim 1 wherein said olefin feed is introduced as a plurality of atomized sprays distributed in a plane above the body of emulsion.

5. Process as defined by claim 1 wherein said isoparaffins comprise isobutane and said olefins comprise butenes, and wherein said catalyst comprises sulfuric acid.

6. In the alkylation of isoparaffin hydrocarbons with olefin hydrocarbons in the presence of a concentrated liquid sulfuric acid catalyst, wherein the olefin hydrocarbons are introduced into a turbulent emulsion comprising isoparaffin hydrocarbons and acid catalyst in a reaction zone, the improvements which comprise introducing the olefin which has been premixed with paraffin hydrocarbons and which contains about 10 volume percent of olefin into the reaction zone in a region above the body of the emulsion at a temperature not to exceed 35° F., separating the olefin into very small droplets in said region and conducting said droplets into said emulsion, which is maintained at the reaction temperature of 40 to 60° F.

7. In the alkylation of isoparaffin hydrocarbons comprising isobutanes with olefin hydrocarbons comprising butenes in the presence of a concentrated liquid sulfuric acid catalyst, wherein said olefin hydrocarbons are introduced into a turbulent emulsion comprising said isoparaffin hydrocarbons and said acid catalyst in a reaction zone, the improvement which comprises introducing the olefin feed which has been premixed with the paraffin hydrocarbons and which contains about 10 volume percent of the olefin into the reaction zone in a region above the body of emulsion, at a temperature not to exceed 35° F., in the form of very small droplets and conducting said droplets into said emulsion, which emulsion is maintained at the reaction temperature of 40 to 60° F.

References Cited in the file of this patent

UNITED STATES PATENTS

| | | |
|---|---|---|
| 2,057,100 | Jespersen | Oct. 13, 1936 |
| 2,391,393 | Coffman et al. | Dec. 25, 1945 |
| 2,432,030 | Matuszak | Dec. 2, 1947 |
| 2,440,730 | Stamatoff | May 4, 1948 |

FOREIGN PATENTS

| | | |
|---|---|---|
| 803,458 | Great Britain | Oct. 22, 1958 |